United States Patent
McIntyre et al.

(10) Patent No.: US 12,311,992 B2
(45) Date of Patent: May 27, 2025

(54) METHOD AND APPARATUS FOR PROTECTING WALLS FROM DAMAGE BY WHEELED CARTS

(71) Applicant: MCGEN ENTERPRISES, LLC, Wilmington, NC (US)

(72) Inventors: Michael McIntyre, Wilmington, NC (US); Anthony Gentile, Jr., Wilmington, NC (US)

(73) Assignee: MCGEN ENTERPRISES, LLC, Wilmington, NC (US)

( * ) Notice: Subject to any disclaimer, the term of this patent is extended or adjusted under 35 U.S.C. 154(b) by 100 days.

(21) Appl. No.: 17/502,220

(22) Filed: Oct. 15, 2021

(65) Prior Publication Data
US 2022/0119026 A1 Apr. 21, 2022

Related U.S. Application Data

(60) Provisional application No. 63/092,187, filed on Oct. 15, 2020.

(51) Int. Cl.
*B62B 5/00* (2006.01)

(52) U.S. Cl.
CPC .................. *B62B 5/0006* (2013.01)

(58) Field of Classification Search
CPC .......................... B62B 5/0006; B62B 2301/08
See application file for complete search history.

(56) References Cited

U.S. PATENT DOCUMENTS

| | | | | |
|---|---|---|---|---|
| 2,935,330 A | * | 5/1960 | Millman | B62B 5/0006 293/19 |
| 3,322,916 A | * | 5/1967 | James | B62B 5/0006 293/120 |
| 3,708,195 A | * | 1/1973 | Kottsieper | B60R 19/20 293/125 |
| 6,170,403 B1 | * | 1/2001 | Behringer | A63G 7/00 104/73 |
| 7,062,805 B2 | * | 6/2006 | Hopper | A61G 1/042 280/47.16 |

(Continued)

OTHER PUBLICATIONS

DuraBumper guards , DuraBumper.com,https://durabumper.com, copyright 2021, 3 pages.

(Continued)

*Primary Examiner* — Jeffrey J Restifo
(74) *Attorney, Agent, or Firm* — Timothy H. Van Dyke; Wolter Van Dyke Davis, PLLC (57) ABSTRACT

An apparatus is presented for protecting walls from damage by a wheeled cart. The apparatus includes an arm including a first end configured to be attached to a frame of the wheeled cart, where the wheeled vehicle includes a platform and a plurality of first wheels configured to move over a floor surface. The arm also includes a second end opposite to the first end, where the second end is positioned between the platform and the floor surface upon attaching the first end to the frame. The apparatus also includes a bumper attached to the second end of the arm such that the bumper is positioned between the platform and the floor surface upon attaching the first end to the frame. A method and kit is also presented for attaching the apparatus to the wheeled cart and using the wheeled cart with the attached apparatus.

18 Claims, 8 Drawing Sheets

(56) References Cited

U.S. PATENT DOCUMENTS

| | | | |
|---|---|---|---|
| 9,303,413 B2 | 4/2016 | Koenig, Jr. et al. | |
| 10,093,335 B2* | 10/2018 | Thuma | B62B 3/005 |
| 10,279,994 B2* | 5/2019 | Russell | B65F 1/1473 |
| D894,517 S* | 8/2020 | Phillips | D34/21 |
| 10,737,711 B2* | 8/2020 | Crowley, Jr. | B62B 3/00 |
| D922,022 S* | 6/2021 | Phillips | D34/21 |
| 2005/0029048 A1* | 2/2005 | Frame | E06C 1/39 |
| | | | 182/152 |
| 2007/0202292 A1* | 8/2007 | Van Der Roest | B62B 5/0006 |
| | | | 428/66.6 |
| 2017/0327141 A1* | 11/2017 | Thuma | B62B 3/10 |
| 2018/0186567 A1* | 7/2018 | Crowley, Jr. | B62B 5/0006 |
| 2021/0114645 A1* | 4/2021 | Pullen | B62B 5/0006 |
| 2022/0119026 A1* | 4/2022 | McIntyre | B62B 5/0006 |

OTHER PUBLICATIONS

DuraBumper guards for Bellman or Bell Carts & Luggage Carts, https://durabumper.com/collections/durabumper-product-line/products/luggage-cart-bumper-guard, copyright 2021, 5 pages.

* cited by examiner

METHOD AND APPARATUS FOR PROTECTING WALLS FROM DAMAGE BY WHEELED CARTS

CROSS-REFERENCE TO RELATED APPLICATIONS

This application claims benefit of Provisional Appln. No. 63/092,187, filed Oct. 15, 2020, the entire contents of which are hereby incorporated by reference as if fully set forth herein, under 35 U.S.C. § 119(e).

BACKGROUND

Figure 1A:
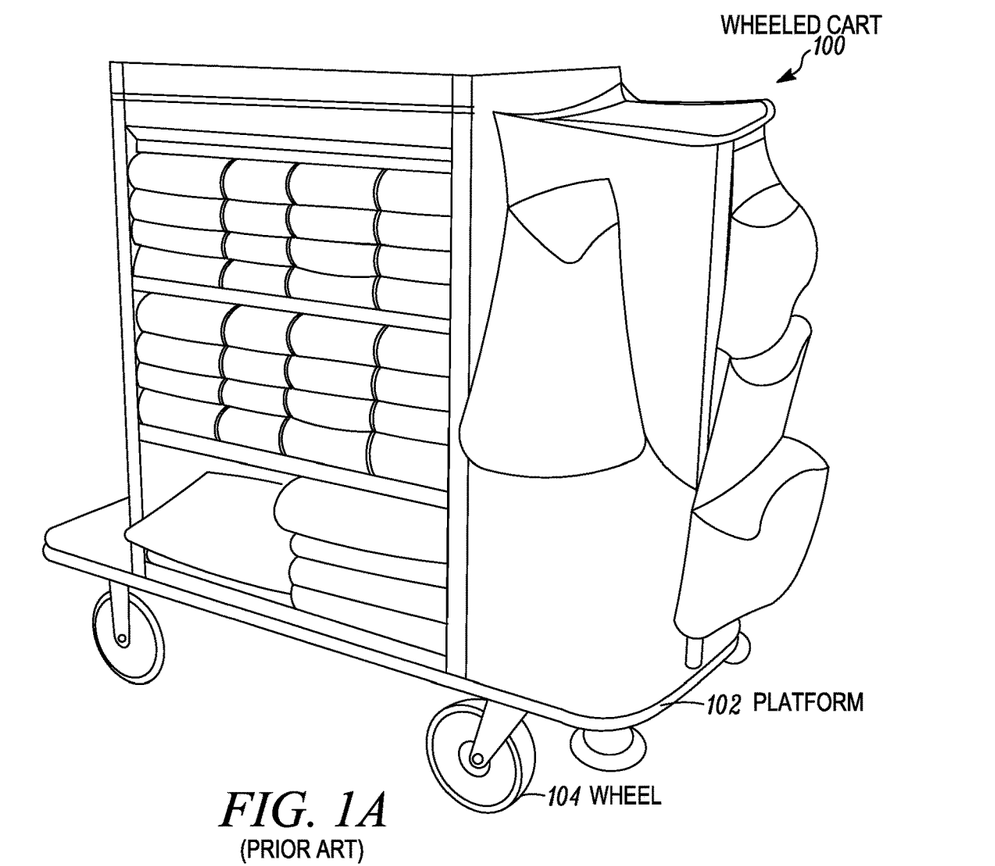
FIG. 1A is an image that illustrates an example of a perspective view of a conventional wheeled cart.
Figure 1B:
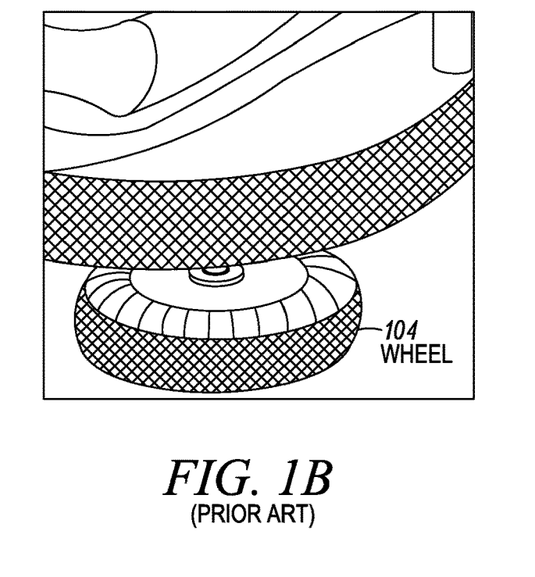
FIG. 1B is an image that illustrates an example of a perspective view of a bumper of the conventional wheeled cart of FIG. 1A.
Figure 1C:
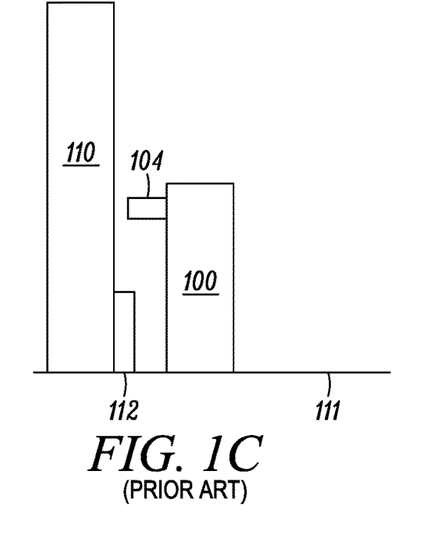
FIG. 1C is a schematic diagram that illustrates an example of a side view of the conventional wheeled cart of FIG. 1A passing over a floor surface and adjacent a wall surface.

FIG. 1A is an image that illustrates an example of a perspective view of a conventional wheeled cart 100. The conventional wheeled cart 100 includes a platform 102 on which cargo is placed (e.g. luggage, towels, cleaning supplies, etc.). FIG. 1B is an image that illustrates an example of a perspective view of a wheel 104 attached to the platform 102 of the conventional wheeled cart 100 of FIG. 1A. FIG. 1C is a schematic diagram that illustrates an example of a side view of the conventional wheeled cart 100 of FIG. 1A passing over a floor surface 111 and adjacent a wall surface 110. As shown in FIG. 1C, as the wheeled cart 100 approaches the wall surface 110, the wheel 104 is positioned to impact the wall surface 110.

SUMMARY

The inventors of the present invention recognized that conventional wheeled carts have significant drawbacks. For example, the conventional wheeled cart 100 of FIGS. 1A through 1C features the wheel 104 attached to the platform 102 at about the same height of the platform 102 above the floor surface 111. The height of the wheel 104 is greater than a height of a baseboard 112 attached to the wall surface 110 adjacent to the floor surface 111. Thus, when the wheeled cart 100 moves into close proximity to the wall surface 110 (FIG. 1C), the wheel 104 impacts the wall surface 110 above the baseboard 112. Thus, the inventors of the present invention recognized that even though the conventional wheeled cart 100 is provided with the wheel 104 to prevent the platform 102 from contacting the wall surface 110, the wheel 104 nevertheless impacts the wall surface 110 and potentially damages the wall surface 110. The inventors of the present invention recognized that such damage to the wall surface 110 could be extensive (e.g. holes, dents, ripped wallpaper, etc.) that require significant repair efforts.

To overcome these noted drawbacks with conventional wheeled carts, the inventors of the present invention developed an apparatus or kit that is attached to a wheeled cart such that a bumper (e.g. wheel) is positioned between the platform and the floor surface at a height that is equal to or less than the height of the baseboard 112. Thus, the inventors recognized that this improved arrangement would result in the bumper (e.g. wheel) contacting the baseboard 112 rather than the wall surface 110. Since damage to a baseboard 112 is less noticeable, less extensive and thus easier to repair than damage to the wall surface 110, the inventors recognized that this improved arrangement would result in significant cost savings to industries (e.g. hotel) that employ these wheeled carts.

The inventors of the present invention also recognized wheeled carts such as those disclosed in U.S. Pat. No. 10,093,335 B2 to Thuma et al. (hereinafter "Thuma") which disclose rollers that are mounted to the frame of a wheeled cart at a height to impact baseboard. However, the inventors of the present invention recognized that Thuma discloses a wheeled cart where the rollers are integral with the wheeled cart frame/design (e.g. are integral with a horizontal bar used to mount a vacuum cleaner to the wheeled cart). Consequently, the inventors of the present invention recognized that wheeled carts such as those disclosed in Thuma cannot be used as a kit to retrofit a conventional wheeled cart in order to convert an existing conventional wheeled cart into an improved wheeled cart which does not impact interior walls of a building. To overcome this noted drawback of Thuma, the inventors of the present invention designed a kit or apparatus that can be used to convert existing conventional wheeled carts (e.g. hotel luggage carts) into improved wheeled carts that do not impact or damage interior walls of buildings where the wheeled cart is utilized. This results in a significant advantage to owners or operators of buildings where multiple conventional wheeled carts are already being employed, as they need not replace all of these conventional wheeled carts with new wheeled carts. Instead, these owners or operators can instead employ the disclosed kit or apparatus disclosed herein to convert the conventional wheeled carts into improved wheeled carts at minimal expense.

The inventors of the present invention also recognized wheeled carts such as those disclosed in Thuma feature rollers mounted directly to the platform of the wheeled cart. Consequently, these wheeled carts are capable of coming within a very close distance to the interior walls. This results in design constraints to the wheeled cart in Thuma, such as a recessed handle on the side of the wheeled cart which would otherwise impact the interior walls if the handle were not recessed. The inventors of the present invention overcame this noted drawback of Thuma by mounting a bumper to be spaced apart (along multiple planes) from the platform. Thus, the improved wheeled cart can remain spaced apart from the interior walls by a larger distance than in conventional wheeled carts and consequently are not restricted to these design constraints taught by Thuma.

In a first embodiment, an apparatus is presented for protecting walls from damage by a wheeled cart. The apparatus includes an arm including a first end configured to be attached to a frame of the wheeled cart, where the wheeled vehicle includes a platform and a plurality of first wheels configured to move over a floor surface. The arm also includes a second end opposite to the first end, where the second end is positioned between the platform and the floor surface upon attaching the first end to the frame. The apparatus also includes a bumper attached to the second end of the arm such that the bumper is positioned between the platform and the floor surface upon attaching the first end to the frame.

In a second embodiment, a method is presented for protecting walls from damage by a wheeled cart. The method includes the step of attaching a first end of an arm to a frame of a wheeled vehicle, where the wheeled vehicle includes a platform and a plurality of first wheels configured to move over a floor surface. The method also includes the step of attaching a bumper to a second end of the arm that is opposite to the first end, such that the bumper is positioned between the platform and the floor surface.

In a third embodiment, a kit is presented to convert a wheeled cart including a frame with a platform and a plurality of wheels configured to move the wheeled cart over a floor surface into an improved wheeled cart such that the frame and the platform does not impact interior walls of a building where the wheeled cart is utilized. The kit includes an arm including a first end configured to be attached to an arcuate portion of the frame of the wheeled cart adjacent a corner of the wheeled cart. The arm also includes a second end opposite to the first end, where the second end is positioned between the platform and the floor surface upon attaching the first end to the frame. The kit also includes a bumper attached to the second end of the arm such that the bumper is positioned between the platform and the floor surface upon attaching the first end to the frame.

Still other aspects, features, and advantages are readily apparent from the following detailed description, simply by illustrating a number of particular embodiments and implementations, including the best mode contemplated for carrying out the invention. Other embodiments are also capable of other and different features and advantages, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

Embodiments are illustrated by way of example, and not by way of limitation, in the figures of the accompanying drawings in which like reference numerals refer to similar elements and in which.

DETAILED DESCRIPTION

A method and apparatus are described for protecting walls from damage by wheeled carts. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Notwithstanding that the numerical ranges and parameters setting forth the broad scope are approximations, the numerical values set forth in specific non-limiting examples are reported as precisely as possible. Any numerical value, however, inherently contains certain errors necessarily resulting from the standard deviation found in their respective testing measurements at the time of this writing. Furthermore, unless otherwise clear from the context, a numerical value presented herein has an implied precision given by the least significant digit. Thus, a value 1.1 implies a value from 1.05 to 1.15. The term "about" is used to indicate a broader range centered on the given value, and unless otherwise clear from the context implies a broader range around the least significant digit, such as "about 1.1" implies a range from 1.0 to 1.2. If the least significant digit is unclear, then the term "about" implies a factor of two, e.g., "about X" implies a value in the range from 0.5X to 2X, for example, about 100 implies a value in a range from 50 to 200. Moreover, all ranges disclosed herein are to be understood to encompass any and all sub-ranges subsumed therein. For example, a range of "less than 10" for a positive only parameter can include any and all sub-ranges between (and including) the minimum value of zero and the maximum value of 10, that is, any and all sub-ranges having a minimum value of equal to or greater than zero and a maximum value of equal to or less than 10, e.g., 1 to 4.

Some embodiments of the invention are described below in the context of protecting surfaces of buildings (e.g., walls) from damage by wheeled carts. In one embodiment, the invention is described in the context of protecting walls of an interior of a building from damage by wheeled carts. In an example embodiment, the invention is described in the context of protecting walls of an establishment that provides paid lodging on a short-term basis (e.g. hotel, motel, etc.) from damage by luggage carts. In an example embodiment, the invention is described in the context of protecting walls of rooms, hallways, elevators, lobbies, etc. of such establishments from damage by wheeled carts. However, the invention is not limited to this context. In other embodiments, the invention can be utilized in any context where carts (wheeled or not-wheeled) are used in an area where they are capable of impacting walls of the area (e.g. hotel, motel, vacation home, airport, retail store, etc.). In some embodiments, the invention is directed to a kit or method for retrofitting an existing conventional wheeled cart (e.g. luggage cart) with an apparatus or assembly to prevent the conventional wheeled cart from damaging interior walls in buildings (e.g. hotel, motel, airport, etc).

For purposes of this description, the term "wheeled carts" means baggage carts, luggage carts, luggage trolleys or trolleys which are small vehicles pushed by travelers (e.g. human-powered) to carry individual luggage (e.g. suitcases). In other embodiments, "wheeled cart" means any cart or trolley utilized by cleaning staff in certain establishments (e.g. cleaning staff of a hotel or motel) where the cart or trolley may transport cleaning products and/or cleaning equipment utilized by the cleaning staff. In still other embodiments, the cart may carry items used by cleaning staff to replenish items at the establishment (e.g. toilet paper rolls or towels to replenish toilet paper or towels at a hotel room). In still other embodiment, the cart may feature a collection area (e.g. bag) for items to be gathered and cleaned at the establishment (e.g. used towels, used sheets, garbage collection area to collect garbage from garbage cans in the establishment). There are two major sizes of wheeled carts, one for big luggage and one for small luggage. Wheeled carts usually have two parts for carrying luggage:

a small section (e.g. basket) for carry-on luggage at the same level as the handle, and a lowered large section or platform for suitcases and small and large bags. Wheeled carts employed by cleaning staff at establishments (e.g. hotels) also have shelves/compartments at an upper area above the platform to hold various items (e.g. toilet paper or clean towels) and other shelves/compartments at a lower level near the platform to store/hold other items. Wheeled carts are provided in airports, large bus stations, hotels, motels, or train stations for transporting luggage (or cleaning products by cleaning staff at the establishment) and may be free of charge. They are sometimes owned by the operator of the establishment. In some facilities carts may be provided by a contractor for a rental fee. Baggage carts are usually built out of steel and equipped with three or four wheels. For safety reasons, they are generally fitted with a brake. Usually, a handle has to be pushed down in order to move the cart, however, in some cases, the handle activates the brake.

Figure 2A:
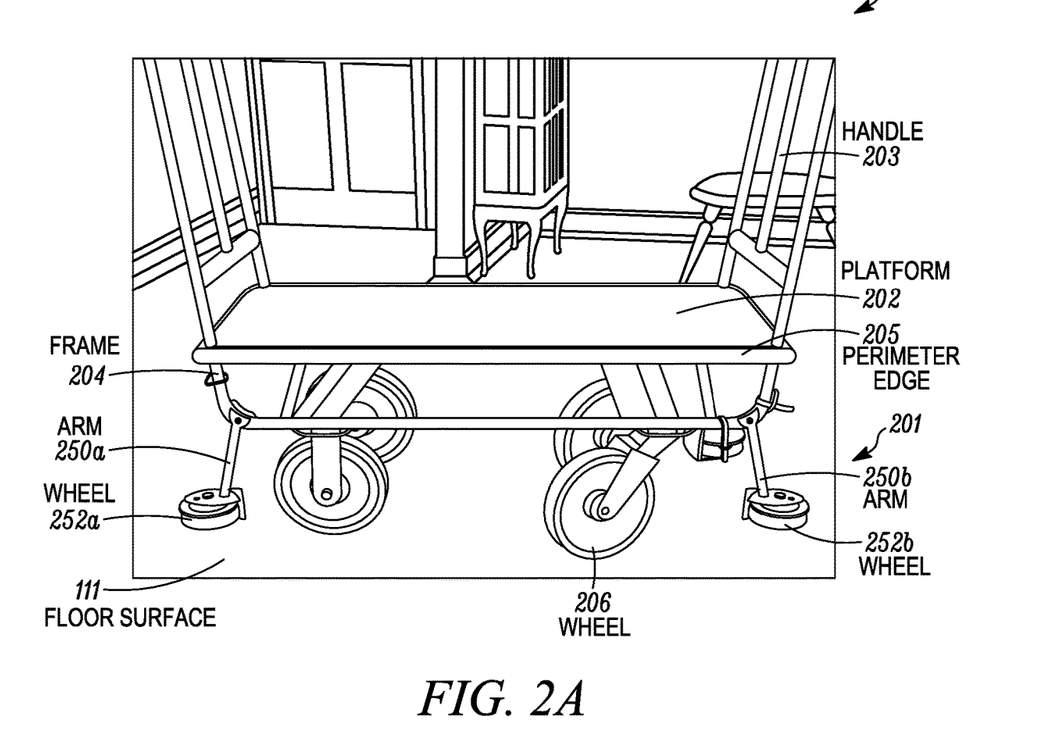
FIG. 2A is an image that illustrates an example of a side view of a wheeled cart with an attached apparatus for protecting walls from the wheeled cart, according to an embodiment.

FIG. 2A is an image that illustrates an example of a side view of a wheeled cart 200 with an attached kit or apparatus 201 for protecting walls from the wheeled cart 200, according to an embodiment. In an embodiment, the kit or apparatus 201 is configured to be retrofitted on a conventional wheeled cart 200 in order to convert the conventional wheeled cart 200 to an improved wheeled cart which does not damage interior walls of a building in which the wheeled cart is utilized. The wheeled cart 200 is not part of the apparatus 201.

In one embodiment, the wheeled cart 200 includes a frame 204 and a plurality of wheels 206 that are mounted to the frame 204 such that the wheeled cart 200 can be moved (e.g. pushed) over a floor surface 111. In an embodiment, the wheels 206 are mounted to the frame 204 such that the wheels 206 can swivel relative to the frame 204. Although four wheels 206 are depicted in FIG. 2A, in other embodiments, the wheeled cart has less or more than four wheels. In another embodiment, the wheeled cart 200 includes a platform 202 with an edge 205 surrounding a perimeter of the platform 202. In some embodiments, the edge 205 is made of a hard material (e.g. metal) and can cause damage to a wall surface if the edge 205 impacts the wall surface. In another embodiment, as shown in FIG. 2A, the wheeled cart 200 includes one or more bars (e.g. a handle 203) that is mounted to the frame 204 and/or platform 202 at opposite ends of the wheeled cart 200. As appreciated by one of ordinary skill in the art, the handle 203 is used to push (or pull) the wheeled cart 200 by a human user over a floor surface 111. In an example embodiment, the bars include vertically and/or horizontally oriented bars that can be used to hold other items (e.g. hang clothing). Although FIG. 2A depicts a rectangular shaped cart 200, in other embodiments, the cart can take any other shape (e.g. square, curved, polygon, etc.). In an example embodiment, the cart 200 is a conventional luggage cart that is used in facilities such as hotels, to transport luggage of guests of the facilities.

In an embodiment, the apparatus 201 is attached to the frame 204 of the wheeled cart 200. Although FIG. 2A depicts that the apparatus 201 includes one or more components that are separately attached to the frame 204, in other embodiments, the apparatus 201 is integral with the frame 204 (e.g. integrally formed with the frame 204). In some embodiments, the apparatus 201 is a kit that is provided in order to convert the conventional wheeled cart 200 to an improved wheeled cart that does not damage interior walls of the building in which the cart 200 is utilized. The inventor recognized such a kit is advantageous as it permits an owner or operator of a building to convert the wheeled carts 200 already being used at the building into improved wheeled carts which do not damage interior walls of the building. The inventors of the present invention recognized this is particularly advantageous as it avoids the owner or operator of the building from having to purchase multiple wheeled carts to replace the conventional wheeled carts, which would likely involve significant expense, relative to the cost of purchasing the apparatus 201 kits. In some embodiments, a kit is provided that includes multiple apparatus' 201 (e.g. four for the four corners of the frame 204) that can be used to convert a conventional wheeled cart into an improved wheeled cart with the advantages disclosed herein. In an embodiment, the apparatus 201 is attached to the frame 204 at each corner (e.g. to each of the four corners of the frame 204 of FIG. 2A).

In an embodiment, as shown in FIG. 2A, the apparatus 201 includes an arm 250 with a first end that is attached to the frame 204 of the wheeled cart 200. In one embodiment, as shown in FIG. 2A the first end of the arm 250 is attached to the frame 204 between the platform 202 and the floor surface 111. In an example embodiment, the first end of the arm 250 is attached to the frame 204 adjacent to each corner of the wheeled vehicle 200. In an embodiment, the inventors recognized that the frame 204 includes an arcuate portion adjacent each corner which is a relatively strong portion of the frame 204. In an example embodiment, this arcuate portion of the frame 204 is featured in conventional luggage carts (e.g. used in hotels to transport luggage). Thus, the inventors of the present invention recognized that it would be advantageous to attach the first end of the arm 250 to this arcuate portion of the frame 204, for enhanced structural stability.

In an embodiment, the arm 250 includes a second end that is opposite from the first end that is attached to the frame 204. As shown in FIG. 2A, upon attaching the first end of the arm 250 to the frame 204 of the wheeled vehicle 200, the second end is positioned between the platform 202 and the floor surface 111.

In an embodiment, the apparatus 201 includes a bumper (e.g. wheel 252) attached to the second end of the arm 250 such that upon attaching the first end of the arm 250 to the frame 204, the wheel 252 is positioned between the platform 202 and the floor surface 111. Although the wheel 252 is depicted as one example of a bumper, in other embodiments any other component can be used other than a wheel provided that it meets other criteria discussed herein for the wheel (e.g. dimension, etc.). In other embodiments, the bumper is a pad that can be used to prevent the cart from impacting the side walls. In an example embodiment, the bumper is sufficiently soft that it does not impact the side wall yet sufficiently rigid that it maintains its form and adequately prevents the cart from impacting the side wall.

In one embodiment, the wheel 252 is rotatably attached to the second end of the arm 250. In an example embodiment, the wheel 252 has a rotational axis that is angled relative to a rotational axis of the wheels 206. In some embodiments, the rotational axis of the wheels 206 are within a plane that is parallel to the floor surface 112 whereas the rotational axis of the wheel 252 is angled (e.g. about orthogonal or in a range from about 70 degrees to about 110 degrees) relative to the floor surface 112. The inventors of the present invention recognized that configuring the wheel 252 to be rotatable at the second end of the arm 250 is advantageous, since upon the wheel 252 making contact with the baseboard it will tend to continue rotation which will minimize the risk of damage to the baseboard. The inventors of the present invention recognized this is advantageous over conventional wheeled carts, which feature a static bumper (e.g. non-rotating wheel 104 in FIG. 1A) that impacts the wall of the building and causes damage in part due to the non-rotating static bumper. As shown in FIG. 2A, in one embodiment the wheel 252 has a diameter (e.g. about 3 inches or in a range from about 2 inches to about 4 inches and/or in a range from about 1 inch to about 6 inches) that is less than a diameter of the wheel 206 (e.g. about 8 inches or in a range from about 6 inches to about 10 inches).

Figure 2B:
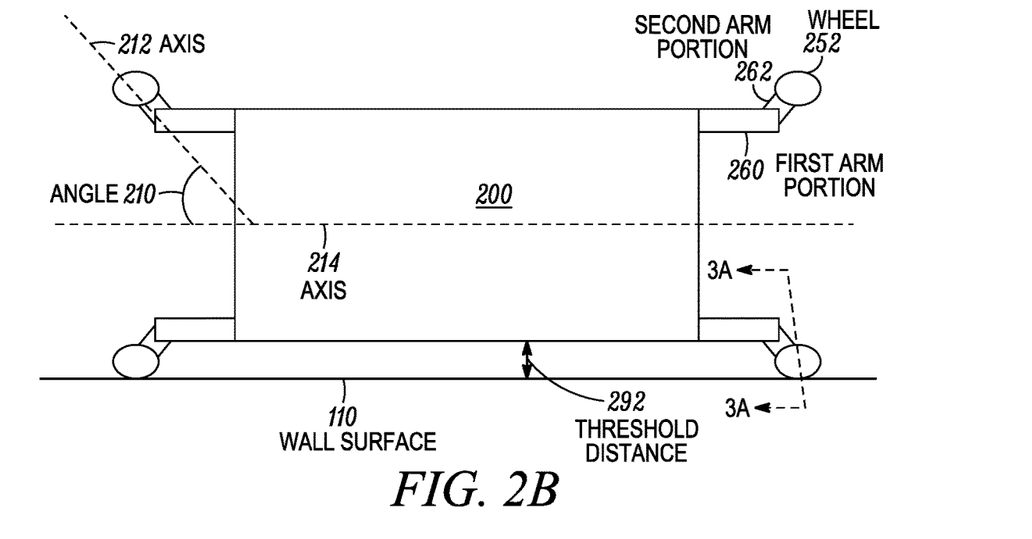
FIG. 2B is a schematic diagram that illustrates an example of a top view of the wheeled cart and apparatus of FIG. 2A, according to an embodiment.
Figure 2C:
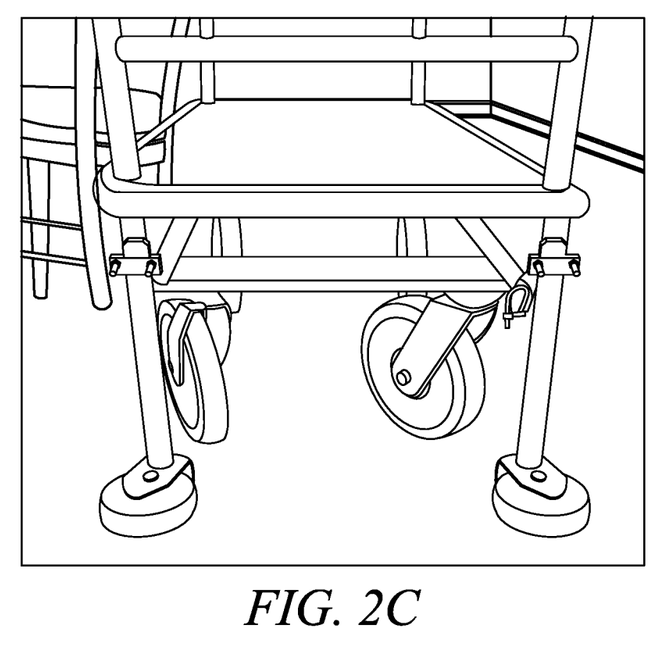
FIGS. 2C through 2F are images that illustrate an example of various views of the wheeled cart and attached apparatus, according to an embodiment.
Figure 2D:
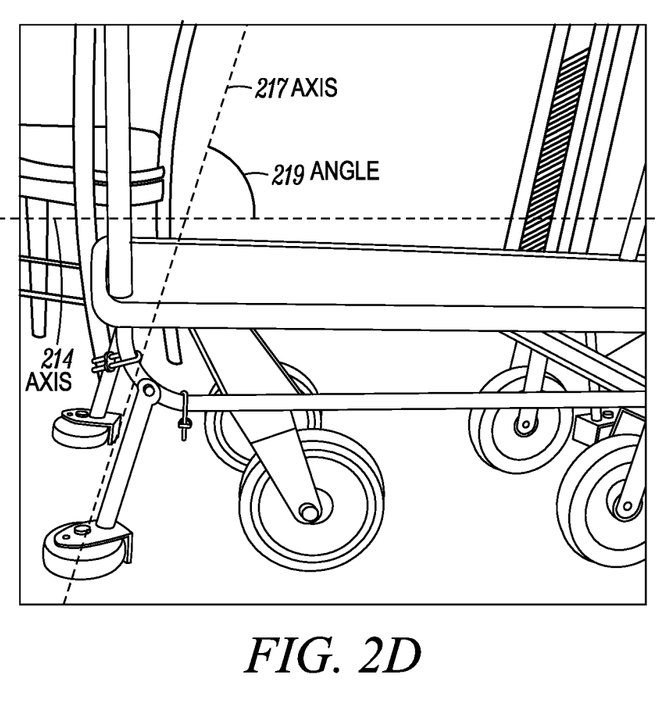

FIG. 2B is a schematic diagram that illustrates an example of a top view of the wheeled cart 200 and apparatus 201 of FIG. 2A, according to an embodiment. In an embodiment, the wheeled cart 200 is used in an interior space with the floor surface 111 and a wall surface 110.

In an embodiment, FIG. 2B depicts that the apparatus 201 (e.g. arm 250 and the wheel 252) are attached to the frame 204 of the wheeled cart 200 adjacent each corner of the wheeled cart 200. In an embodiment, the arm 250 includes a first arm portion 260 that includes the first end that is attached to the frame 204 of the wheeled cart 200 and a second arm portion 262 that includes the second end where the wheel 252 is rotatably mounted. In one embodiment, the second arm portion 262 is defined by an axis 212. Upon attaching the arm 250 to the wheeled cart 200, the second arm portion 262 (and axis 212) is oriented at a first angle 210 relative to a longitudinal axis 214 of the wheeled cart 200. In an example embodiment, the first angle 210 will vary dependent upon dimensions of the wheeled cart 200 and a threshold distance 292 (FIG. 2B) that the cart 200 can reach within the wall surface 110. In an example embodiment, the value of the angle 210 increases based on an increase in the threshold distance 292. In an example embodiment, the angle 210 has a value of about 30 degrees or in a range from about 20 degrees to about 45 degrees and/or in a range from about 15 degrees to about 60 degrees. In an embodiment, the longitudinal axis 214 of the wheeled cart 200 is defined as an axis that extends along a length dimension of the wheeled cart 200 (e.g. rectangular wheeled cart). In an example embodiment, the first angle 210 is measured in a first plane that is parallel to the platform 202 of the wheeled cart 200 and/or the floor surface 111.

In an embodiment, the first arm portion 260 of the arm 250 is oriented along the longitudinal axis 214 of the wheeled cart 200 and the second arm portion 262 of the arm 250 is oriented at the first angle 210 relative to the longitudinal axis 214. Although FIG. 2B depicts that the arm 250 includes the first arm portion 260 aligned with the longitudinal axis 214 and the second arm portion 262 that is angled (e.g. angle 210) relative to the first arm portion 260, in other embodiments, the arm 250 is a linear arm segment with the first end attached to the frame 204 and the second end to rotatably mount the wheel 252. In this example embodiment, where the arm 250 is a linear arm segment, the linear arm segment would be oriented at an angle relative to the longitudinal axis 214 that is less than the angle 210.

In an embodiment, as shown in FIG. 2B the apparatus 201 advantageously prevents the wheeled cart 200 and thus the edge 205 of the platform 202 from contacting the wall surface 110, since the apparatus 201 prevents the wheeled cart 200 from approaching within a threshold distance 292 of the wall surface 110. In an example embodiment, the threshold distance 292 is about 2 inches or in a range from about 1 inch to about 3 inches and/or in a range from about 0.5 inches to about 5 inches. In some embodiments, the threshold distance 292 is adjusted to account for any portions of the wheeled cart 200 that may extend beyond the dimensions of the platform 102 (e.g. a handle of the cart 200 that may extend beyond the dimensions of the platform 102). In this embodiment, the threshold distance 292 is set to be slightly greater than any overhanging components of the wheeled cart 200. In an embodiment, the value of the threshold distance 292 is selected to be large enough to protect the wall surface 110 from impact with the cart 200 yet small enough that the cart 200 does not interfere with movement in the interior area (e.g. hotel hallway, etc.). As shown in FIG. 2B, upon the wheeled cart 200 reaching within the threshold distance 292 of the wall surface 110, the wheels 252 (at two corners along the length of the wheeled cart 200) make contact with the baseboard 112 and thus no portion of the wheeled cart 200 or apparatus 201 contact the wall surface 110. In an embodiment, the threshold distance 292 is based on one or more parameter values such as the angle 210 and a dimension (e.g. diameter) of the wheel 252. The inventors of the prevent invention recognized that the diameter of the wheel 252 should be large enough that impact with the baseboard 112 will not cause extensive damage (e.g. dents) in the baseboard 112. In an example embodiment, the inventors recognized that a smaller diameter wheel is more likely to cause dents and other extensive impact than larger diameter wheels. The inventors also recognized that the diameter of the wheel 252 should be small enough not to interfere with the operation of the wheeled cart 200 (e.g. not prevent swiveling of the wheel 206 adjacent to the wheel 252, not obstruct others walking adjacent to the wheeled vehicle 200, etc.).

Figure 2E:
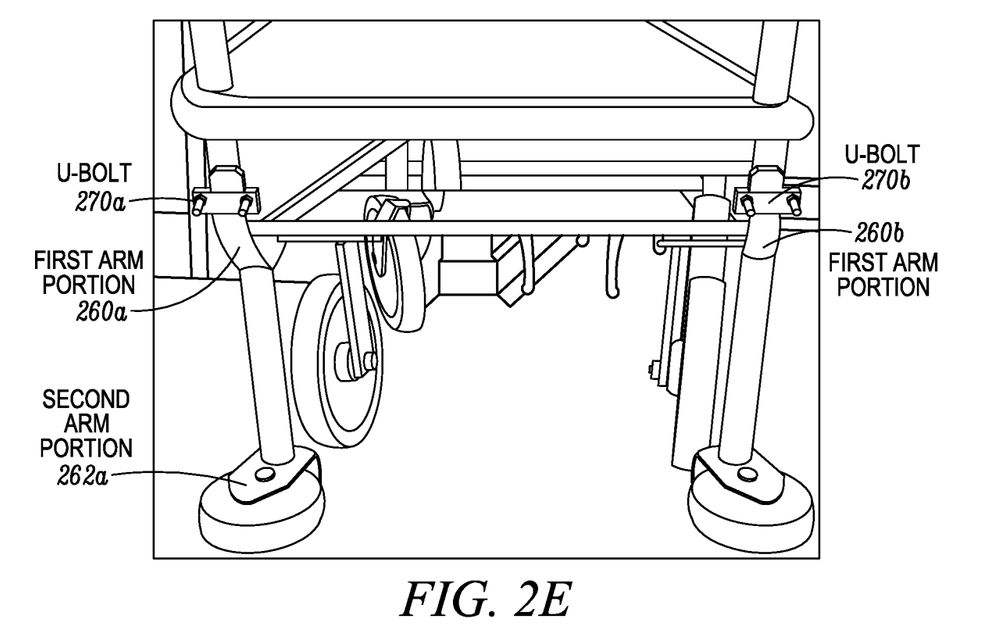
Figure 2F:
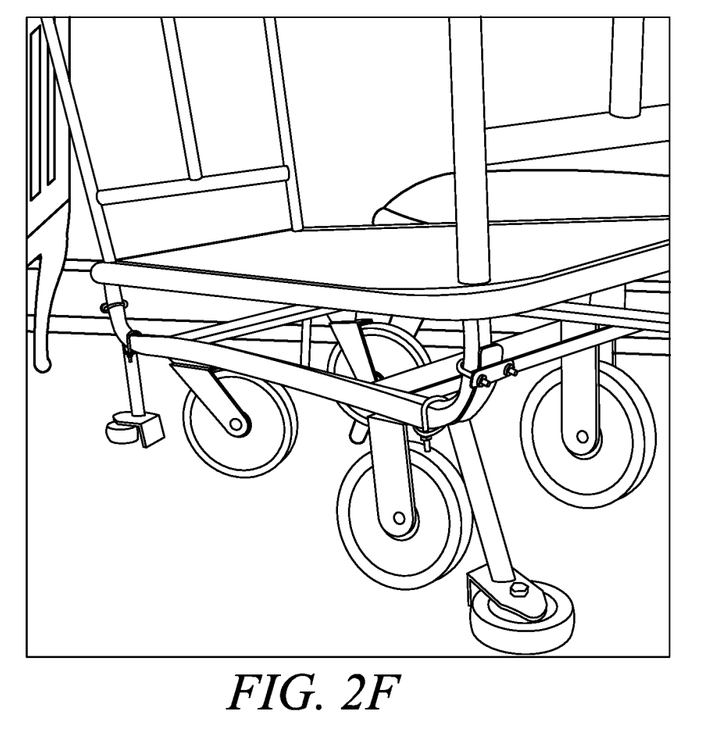

FIGS. 2C through 2F are images that illustrate an example of various views of the wheeled cart 200 and attached apparatus 201, according to an embodiment. In one embodiment, the first arm portion 260 (FIG. 2E) is attached to the frame 204 at a corner of the wheeled cart 200. In an example embodiment, as shown in FIG. 2F, the first arm portion 260 has an arcuate shape that is configured based on an arcuate shape of the frame 204 at the corner of the wheeled cart 200. The inventors of the present invention recognized that the arcuate portion of the frame 204 adjacent the corner of the wheeled vehicle 200 is the strongest portion of the frame 204 and thus it would be advantageous to connect the arm 250 to the frame 204 at this arcuate portion. In an example embodiment, the first arm portion 260 is secured to the arcuate portion of the frame 204 with a fastening means (e.g., one or more U-bolts 270 including one or more fasteners secured through the U-bolt 270) to secure the first arm portion 260 to the arcuate portion of the frame 204. Although FIG. 2E depicts the use of one or more U-bolts to secure the first arm portion 260 to the frame 204 in other embodiments any mechanism or device can be used to secure the first arm portion 260 to the frame 204, as appreciated by one of ordinary skill in the art. Additionally, in still other embodiments, the arm 250 is integral (e.g. integrally formed) with the frame 204 and thus no components are needed to secure the arm 250 to the frame 204. In this embodiment, the arm 250 is not a component of a kit or apparatus to convert the wheeled cart 200 into an improved wheeled cart that does not damage interior walls of buildings.

Figure 3A:
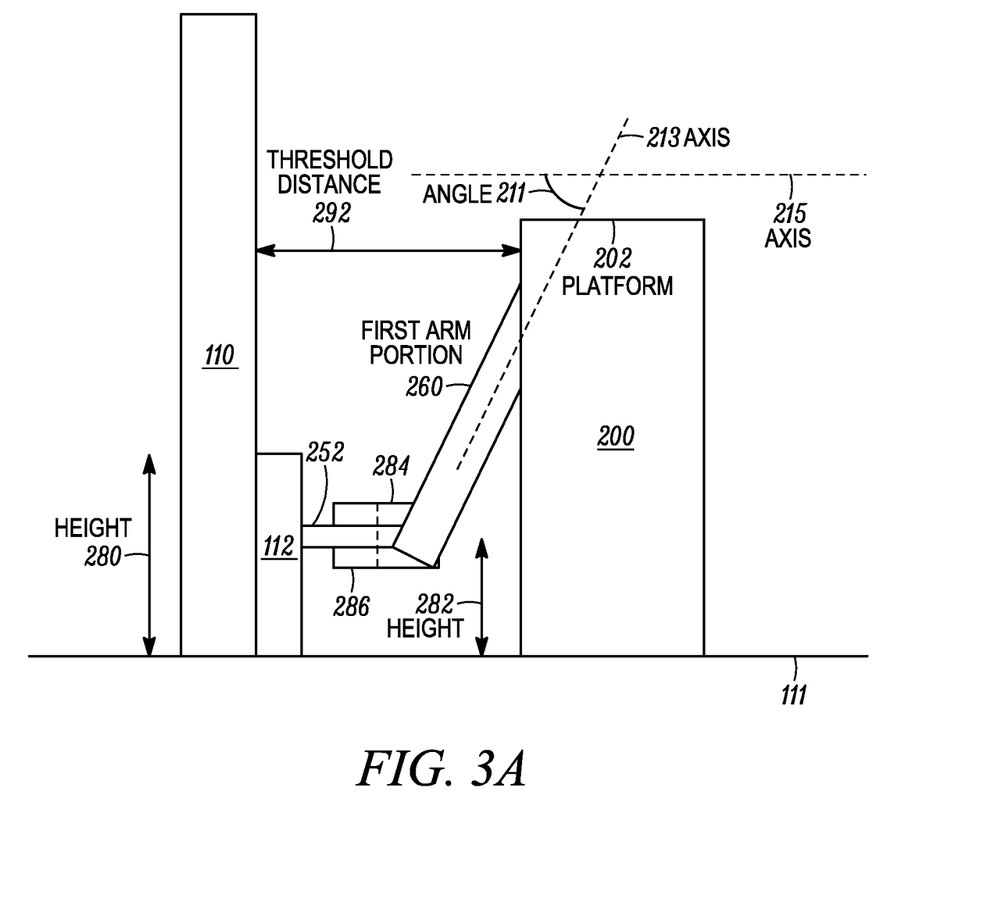
FIG. 3A is a schematic diagram that shows a cross sectional view of the wheeled cart and apparatus taken along the line 3A-3A in FIG. 2B, according to an embodiment.
Figure 3B:
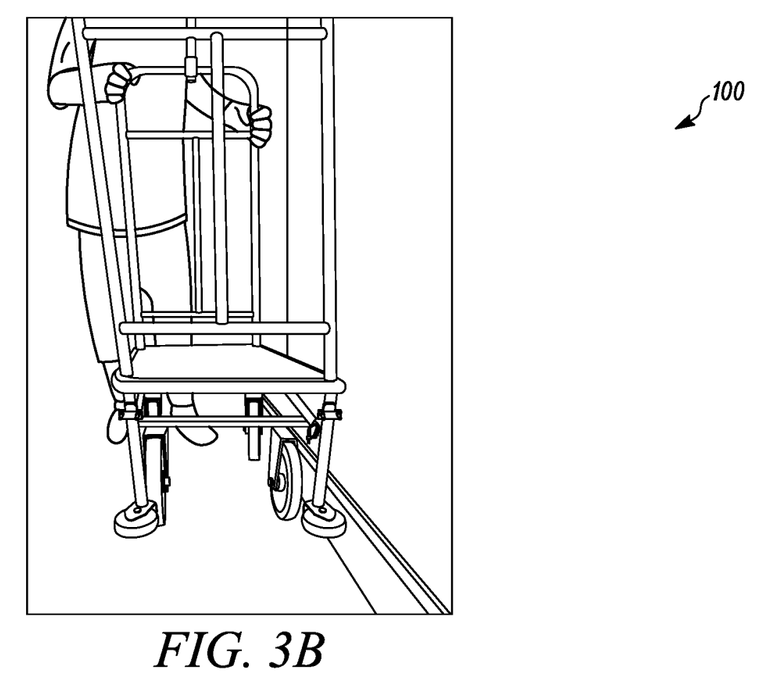
FIGS. 3B through 3E are images that illustrate an example of various views of the wheeled cart and attached apparatus adjacent to a wall surface, according to an embodiment.
Figure 3C:
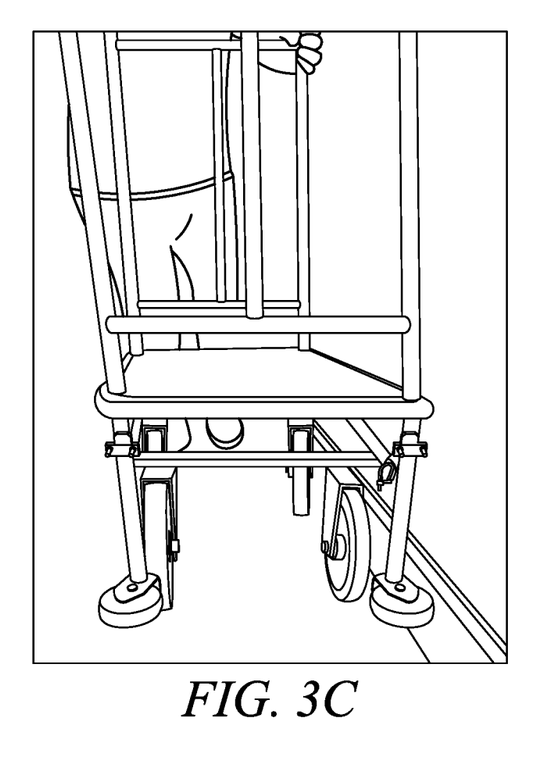
Figure 3D:
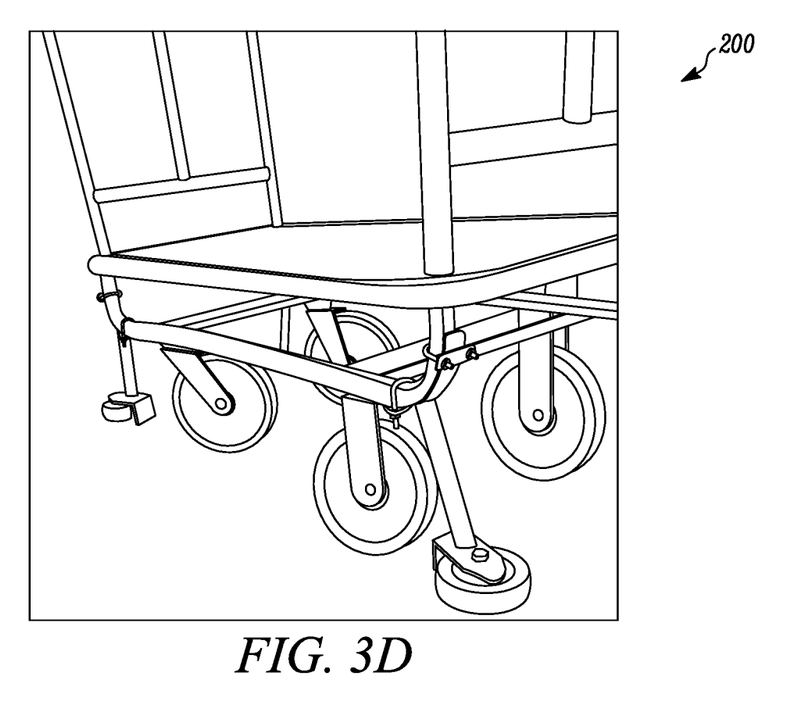

FIG. 3A is a schematic diagram that shows a cross sectional view of the wheeled cart 200 and apparatus 201 taken along the line 3A-3A in FIG. 2B, according to an embodiment. In an embodiment, the second end of the arm 250 (second arm portion 262) includes an upper portion 284 and a lower portion 286 that define a cavity in which the wheel 252 is rotatably attached. The wheel 252 is rotatably attached within the cavity based on a fastener (dotted line in FIG. 3A) secured through the upper portion 284, the lower portion 286 and an opening defined by the wheel 252. In an example embodiment, the rotational axis of the wheel 252 is aligned with the fastener.

In an embodiment, as shown in FIG. 3A, the first arm portion 260 is attached to the frame 204 such that the first arm portion 260 (oriented along axis 213) is oriented at a second angle 211 relative to a transverse axis 215 of the wheeled cart 200 (e.g. the transverse axis 215 is orthogonal to the longitudinal axis 214 of FIG. 2B and along a width dimension of the wheeled cart 200). In an example embodiment, the second angle 211 is measured in a second plane that intersects the transverse axis 215 and is angled (e.g. orthogonal) relative to the platform 202. In an example embodiment, the arm 250 is configured such that upon securing the first arm portion 260 to the frame 204, the second angle 211 is about 45 degrees or in a range from about 30 degrees to about 60 degrees.

In an embodiment, the wheeled cart 200 is configured to move over the floor surface 111 in an interior area (e.g. room, hallway, lobby, etc.) that includes the wall surface 110 and the baseboard 112 attached to the wall surface 110 adjacent to the floor surface 111. In an embodiment, the wheel 252 is attached to the second end of the arm 250 such that the wheel 252 is positioned at a first height 282 (FIG. 3A) above the floor surface 111 that is equal to or less than a second height 280 of the baseboard 112 above the floor surface 111. In an example embodiment, the first height 282 is about 2 inches or in a range from about 1 inch to about 3 inches and the second height 280 is about 3 inches or in a range from about 2 inches to about 4 inches. Since the first height 282 of the wheel 252 is equal to or less than the second height 280 of the baseboard 112 above the floor surface 111, the wheel 252 conveniently makes impact with the baseboard 112 if the wheeled cart 200 comes within the threshold distance 292 of the wall surface 110. In one example embodiment, the platform 202 of the conventional wheeled cart 200 is at a height of about 12 inches above the floor surface 111 or in a range from about 10 inches to about 20 inches above the floor surface 111. Thus, in this example embodiment, the arm 250 secures the wheel 252 to the frame 204 such that the wheel 252 is about 10 inches below the platform 202 or in a range from about 8 inches to about 18 inches below the platform 202. In yet another example embodiment, the arm 250 secures the wheel 252 to the frame 204 such that the wheel 252 is positioned beyond a midpoint between the platform 202 and the floor surface 111.

Figure 3E:
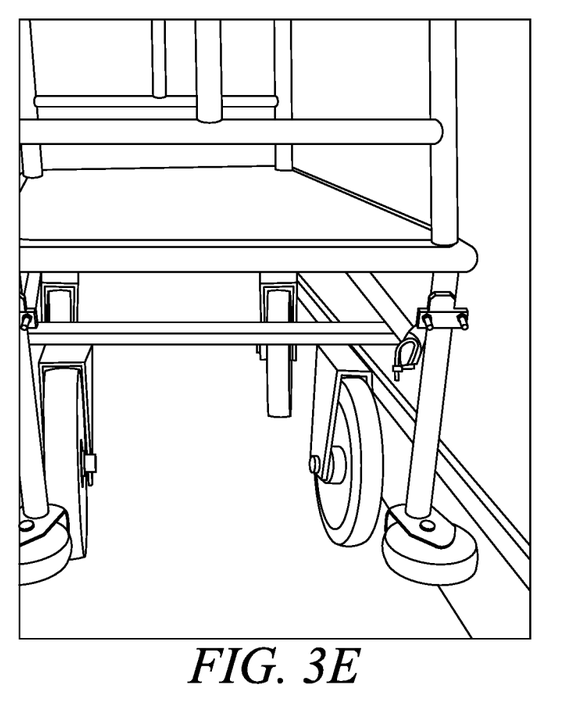

The inventors of the present invention recognized that this arrangement advantageously ensures that in the event that the wheeled cart 200 does approach within the threshold distance 292 of the wall surface 110, only the baseboard 112 is impacted by the wheeled cart 200 and the wall surface 110 is not impacted. Since the baseboard 112 is less visible than the wall surface 110 above the baseboard 112, any damage done to the baseboard 112 will not be as easily recognized by visitors to the interior area (e.g. hotel guests). Additionally, the inventors recognized that since the baseboard 112 is made from a harder material than some wall surfaces 110 (e.g. drywall), the extent of any damage to the baseboard 112 will likely be less than damage that would have done to the wall surface 110 without the apparatus 201. Whereas the edge 205 of the platform 202 may cause a dent or a hole in the wall surface 110 (e.g. drywall) with the conventional wheeled cart, the inventors recognized that the wheel 252 in the improved wheeled cart may only cause a mark on the baseboard 112 (e.g. that can be easily wiped off). Yet further, the inventors recognized that due to one or more features of the wheel 252 (e.g. rotatable, dimension within a certain range, etc.) the extent of damage that the wheel 252 causes to the baseboard 112 is minimized. For example, the rotatable feature of the wheel 252 ensures that the wheel 252 continues to rotate upon impact with the baseboard 112, which will reduce the extent of damage to the baseboard 112. In another example, the wheel 252 diameter being larger than a certain value will minimize damage to the baseboard 112 since a smaller diameter wheel may cause greater damage (e.g. greater risk of leaving a dent in the baseboard 112). FIGS. 3B through 3E are images that illustrate an example of various views of the wheeled cart 200 and attached apparatus 201 adjacent to a wall surface, according to an embodiment. In an example embodiment, FIG. 3E depicts the wheel 252 contacting the baseboard 112 and thus preventing the edge 203 of the platform 202 from making contact and potentially damaging the wall surface 110.

In an embodiment, the angle 211 may be about zero degrees (e.g. within a range from about −10 degrees to about +10 degrees and/or in a range from about −20 degrees to about +20 degrees), such that the first arm portion 260 is substantially aligned with the longitudinal axis 214 (FIG. 2E). In other embodiments, the first arm portion 260 makes an angle 219 (FIG. 2D) with the longitudinal axis 214 in a plane that is aligned with the longitudinal axis 214 and is about orthogonal to the platform 202. In an example embodiment, the value of the angle 219 is about 60 degrees or in a range from about 45 degrees to about 75 degrees.

Figure 4:
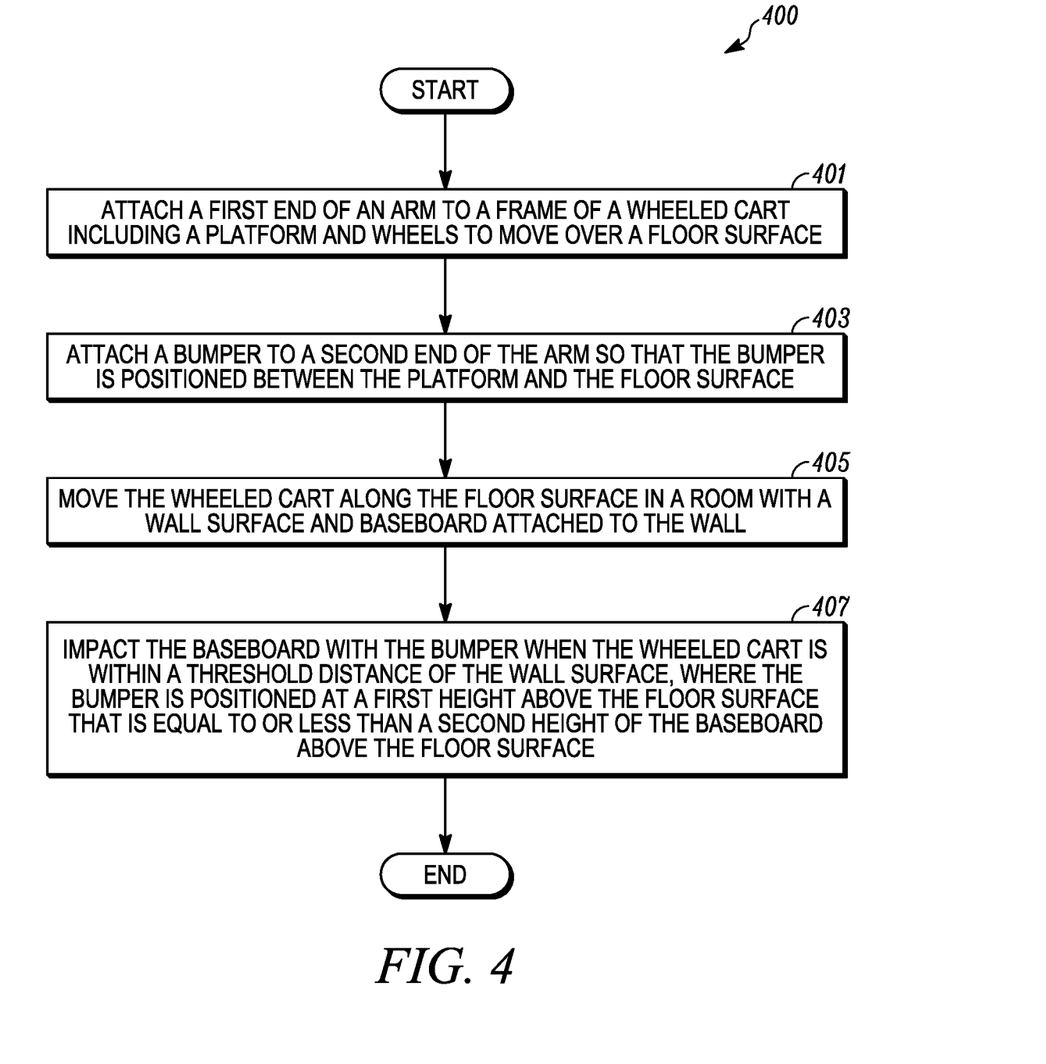
FIG. 4 is a flowchart that illustrates an example of a method for attaching the apparatus to the wheeled cart and using the wheeled cart with the attached apparatus, according to an embodiment.

FIG. 4 is a flowchart that illustrates an example of a method 400 for attaching the kit or apparatus 201 to the wheeled cart 200 (e.g. conventional hotel luggage cart) and/or using the wheeled cart 200 with the attached apparatus 201, according to an embodiment. Although steps are depicted in FIG. 4 as integral steps in a particular order for purposes of illustration, in other embodiments, one or more steps, or portions thereof, are performed in a different order, or overlapping in time, in series or in parallel, or are omitted, or one or more additional steps are added, or the method is changed in some combination of ways. As previously disclosed, in one embodiment the method 400 is employed to convert a conventional wheeled cart 200 (e.g. that can damage an interior wall of a building in which the cart 200 is utilized) to an improved wheeled cart that does not damage interior walls of the building due to the kit or apparatus 200.

In an embodiment, step 401 involves attaching the first end of the arm 250 to the frame 204 of the wheeled cart 200. In one embodiment, this step is performed using a conventional wheeled cart 200 (e.g. conventional hotel luggage cart) which is to be converted into an improved wheeled cart (e.g. that does not damage interior walls of the building where it is utilized). However, in other embodiments step 401 may be performed by a manufacturer of wheeled carts during the manufacturing of said wheeled carts. In one embodiment, step 401 includes fastening the first arm portion 260 of the arm 250 to the frame 204 using one or more fasteners. In an example embodiment, in step 401 the first arm portion 260 includes an arcuate portion (FIG. 2E) that is aligned with an arcuate portion of the frame 204 adjacent a corner of the wheeled cart 200 and the arcuate portion of the first arm portion 260 is secured to the arcuate portion of the frame 204. In an example embodiment, a pair of U-bolts 270 are used to secure the arcuate portion of the first arm portion 260 to the arcuate portion of the frame 204. In other embodiments, in step 401 the first arm portion 260 includes a flat portion (e.g. plate with openings) that is secured to a portion of the frame 204 (e.g. flat portion through which openings are formed). In these embodiments one or more fasteners are passed through the openings in the flat portion of the first arm portion 260 and the openings in the frame 204, to secure the first arm portion 260 to the frame 204. In other embodiments, other mechanisms may be used to secure the first end of the arm 250 to the frame 204 other than U-bolts. In still other embodiments, the arm 250 is integrally formed with the frame 204 and thus step 401 is omitted.

In an embodiment, step 403 involves attaching a bumper to the second end of the arm 250 that is opposite to the first end, such that the bumper is positioned between the frame 204 (e.g., the platform 202) and the floor surface 111. In one embodiment, the bumper is the wheel 252 and in step 403 the wheel 252 is rotatably attached to the second arm portion 262. In an example embodiment, in step 403 the wheel 252 is positioned in a cavity defined between the upper portion 284 and lower portion 286 of the second arm portion 262 and a fastener (dotted line in FIG. 3A) is passed through the upper and lower portions 284, 286 and a hole defined by the wheel 252 to rotatably secure the wheel 252 to the second arm portion 262. In an example embodiment, upon performing step 403 the wheel 252 is positioned between the platform 202 and the floor surface 111 and/or is positioned at a height 282 above the floor surface 111 that is less than or equal to a height 280 of baseboard 112 attached to the wall surface 110 adjacent to the floor surface 111. In another example embodiment, upon performing step 403 the wheel 252 is positioned closer to the floor surface (e.g. about 2 inches to about 3 inches) than to the platform 202 (e.g., about 8 inches to about 10 inches). Although step 401 is shown in the flowchart as preceding step 403, in some embodiments step 403 is performed prior to step 401. In an example embodiment, where the apparatus 201 is packaged and used to convert the wheeled cart 200 to an improved wheeled cart, the wheel 252 is already attached to the second end of the arm 250 before the apparatus 201 is packaged.

In an embodiment, step 405 involves moving the wheeled cart 200 along the floor surface 111 in an interior area that includes the wall surface 110 and the baseboard 112 attached to the wall surface 110 adjacent to the floor surface 111. In one embodiment, step 405 is performed by a user manually moving (e.g. pushing or pulling) the wheeled cart 200 along the floor surface 111. In an example embodiment, step 405 is performed by the user holding the handle 203 of the wheeled cart 200 and pushing the wheeled cart 200 over the floor surface 111.

In an embodiment, in step 407 as the wheeled cart 200 is being moved over the floor surface 111 during step 405 and the wheeled cart 200 comes within the threshold distance 292 (FIG. 2B, FIG. 3A) of the wall surface 110, the wheel 252 makes impact with the baseboard 112. Since the wheel 252 is positioned at the height 282 that is less than or equal to the height 280 of the baseboard 112, the wheel 252 impacts the baseboard 112 and not the wall surface 110 above the baseboard 112. In an example embodiment, in step 407 as the wheel 252 impacts the baseboard 112 the wheel 252 rotates about a rotational axis (based on the fastener passed through the opening of the wheel 252) such that the wheel 252 rotates during the impact and thus minimizes any damage to the baseboard 112. In one embodiment, step 405 is performed by a user manually moving (e.g. pushing or pulling) the wheeled cart 200 along the floor surface 111. In an example embodiment, step 405 is performed by the user holding the handle 203 of the wheeled cart 200 and pushing the wheeled cart 200 over the floor surface 111.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense. Throughout this specification and the claims, unless the context requires otherwise, the word "comprise" and its variations, such as "comprises" and "comprising," will be understood to imply the inclusion of a stated item, element or step or group of items, elements or steps but not the exclusion of any other item, element or step or group of items, elements or steps. Furthermore, the indefinite article "a" or "an" is meant to indicate one or more of the item, element or step modified by the article.

What is claimed is:

1. An apparatus comprising:
    an arm including;
        a first end configured to be attached to a frame of a wheeled cart comprising a platform and a plurality of first wheels configured to move over a floor surface, and a second end opposite to the first end, wherein the second end is positioned between the platform and the floor surface at a first height above the floor surface upon attaching the first end to the frame; and
    a bumper that is a second wheel rotatably attached to the second end of the arm such that the bumper is positioned between the platform and the floor surface at the first height above the floor surface;
    wherein the arm is detachable to the frame of the wheeled cart adjacent to the platform such that the arm is configured to be attached and detached to the frame of the wheeled cart adjacent to the platform;
    wherein the arm is configured such that upon attachment of the first end to the frame of the wheeled cart;
        a second angle between the arm and a transverse axis along a width dimension of the wheeled cart and orthogonal to a longitudinal axis of the wheeled cart is in a range from about 30 degrees to about 60 degrees,
        the first height of the second end above the floor surface is in a range from about 1 inch to about 3 inches and the second end is positioned below the platform in a range from about 8 inches to about 18 inches such that the second end is more proximate to the floor surface than the platform upon attaching the first end to the frame, and
        the first height of the second end above the floor surface is less than or equal to a second height of a baseboard above the floor surface such that upon the wheeled cart coming within a threshold distance of the wall, the arm is configured such that the bumper only impacts the baseboard and does not impact the wall above the baseboard.

2. The apparatus of claim 1, wherein the second height of the baseboard is in a range from about 2 inches to about 4 inches above the floor surface.

3. The apparatus of claim 1, wherein the second wheel has a second rotational axis that is angled relative to a first rotational axis of the first wheels;
    wherein the second wheel is configured to rotate about the second rotational axis such that upon the second wheel making contact with the baseboard the second wheel is configured to continue to rotate to reduce damage to the baseboard upon impacting the baseboard.

4. The apparatus of claim 3, wherein a diameter of the second wheel is in a range from about 2 inches to about 6 inches, and wherein the diameter of the second wheel is selected to reduce damage to the baseboard upon impact of the second wheel with the baseboard.

5. The apparatus of claim 1, wherein the second end of the arm includes an upper portion and a lower portion that define a cavity in which to rotatably attach the second wheel based on a fastener secured through the upper portion, the lower portion and an opening defined by the second wheel such that a rotational axis of the second wheel is aligned with the fastener.

6. The apparatus of claim 1, wherein the wheeled cart is a rectangular wheeled cart including four corners and wherein the arm and the bumper are attached to the frame of the vehicle adjacent each corner of the wheeled cart.

7. The apparatus of claim 1, where the arm is oriented at a first angle relative to a longitudinal axis of the wheeled cart, wherein the first angle is measured in a first plane that is parallel to the platform.

8. The apparatus of claim 7, wherein a first arm portion of the arm includes the first end of the arm and the first arm portion is oriented along the longitudinal axis of the wheeled cart and wherein a second arm portion of the arm includes the second end of the arm and the second arm portion is oriented at the first angle relative to the longitudinal axis.

9. The apparatus of claim 7, wherein the first angle has a value in a range from about 20 degrees to about 45 degrees.

10. The apparatus of claim 9, wherein the threshold distance is based on the value of the first angle and wherein the threshold distance is in a range from about 1 inch to about 3 inches based on the value of the first angle in the range from about 20 degrees to about 45 degrees.

11. The apparatus of claim 1, where the angle is measured in a second plane that is orthogonal to the platform.

12. The apparatus of claim 1, wherein the first end is configured to be attached to the frame of the vehicle between the platform and the floor surface.

13. The apparatus of claim 1, wherein the apparatus is configured to convert a first wheeled cart to a second wheeled cart;
wherein the first wheeled cart includes a bumper that is attached to a frame of the first wheeled cart and the bumper is positioned to impact the wall surface above the baseboard upon the first wheeled cart approaching the wall surface; and
wherein the second wheeled cart includes the bumper of the apparatus of claim 1 attached to the frame of the second wheeled cart such that the bumper is positioned to only impact the baseboard and is not positioned to impact the wall surface above the baseboard upon the second wheeled cart approaching the wall surface such that damage to the wall surface is avoided with the second wheeled cart.

14. The apparatus of claim 1, wherein the first end is configured to be attached to an arcuate portion of the frame of the vehicle between the platform and the floor surface and wherein the arcuate portion of the frame is adjacent a corner of the wheeled vehicle;
wherein the arm includes a first arm portion including the first end, wherein the first arm portion includes an arcuate portion configured to be aligned with the arcuate portion of the frame adjacent the corner of the frame and wherein the arcuate portion of the first arm portion is configured to be secured to the arcuate portion of the frame.

15. The apparatus of claim 14, further comprising a U-bolt;
wherein the arcuate portion of the first arm portion is configured to be attached to the arcuate portion of the frame of the vehicle using the U-bolt.

16. A system comprising:
a wheeled cart comprising a platform and a plurality of first wheels configured to move over a floor surface, wherein the platform is at a height in a range from about 10 inches to about 20 inches above the floor surface;
an arm including;
a first end configured to be attached to a frame of the wheeled cart, and a second end opposite to the first end, wherein the second end is positioned between the platform and the floor surface upon attaching the first end to the frame; and
a bumper that is a second wheel rotatably attached to the second end of the arm such that the bumper is positioned below the platform by a distance in a range between about 8 inches and about 18 inches and wherein the bumper is positioned between the platform and the floor surface and more proximate to the floor surface than the platform upon attaching the first end to the frame.

17. The system of claim 16, wherein the wheeled cart is a luggage cart comprising:
the platform configured to hold luggage or bags;
a handle mounted to the frame or the platform at opposite ends of the wheeled cart, wherein the handle is configured to be pushed by a user to move the wheeled cart over the floor surface; and
one or more bars positioned above the platform that are configured to hang clothing.

18. The system of claim 16, wherein the arm is detachable to the frame of the wheeled cart adjacent to the platform such that the arm is configured to be attached and detached to the frame of the wheeled cart adjacent to the platform;
wherein the arm is configured such that upon attachment of the first end to the frame of the wheeled cart;
an angle between the arm and a transverse axis along a width dimension of the wheeled cart and orthogonal to a longitudinal axis of the wheeled cart is in a range from about 30 degrees to about 60 degrees,
the first height of the second end above the floor surface is in a range from about 1 inch to about 3 inches and the second end is positioned below the platform in a range from about 8 inches to about 18 inches such that the second end is more proximate to the floor surface than the platform upon attaching the first end to the frame, and
the first height of the second end above the floor surface is less than or equal to a second height of a baseboard in a range between about 2 inches and 4 inches above the floor surface such that upon the wheeled cart coming within a threshold distance of the wall, the arm is configured such that the bumper only impacts the baseboard and does not impact the wall above the baseboard.

* * * * *